United States Patent Office 3,681,017
Patented Aug. 1, 1972

3,681,017
PLATELET SILICA, ITS PRODUCTION AND USES
Howard J. Butcher, St. Marys City, and Edgar Alan Simpson, Ellicott City, Md., assignors to W. R. Grace & Co., New York, N.Y.
No Drawing. Filed July 6, 1970, Ser. No. 52,711
Int. Cl. C01b 33/00
U.S. Cl. 23—182                               14 Claims

ABSTRACT OF THE DISCLOSURE

Microporous platelet silica is prepared from the ammonium form of sodium silicate (i) by freeze-drying and filtration or (ii) by freezing and thawing and filtration, or (iii) by lowering the pH and repeating (ii). The resultant unitary, polymeric, microporous silica platelets can be used as fillers in high gloss films.

BACKGROUND OF THE INVENTION

This invention relates to a method for producing a microporous platelet silica gel. In a further mode, this invention relates to preparing a unitary polymeric microporous platelet silica gel by a freeze drying or a freezing and thawing process.

This platelet silica can be used as the base in fluorescent pigments, as reinforcing agents in polymeric varnish films and as compatible fillers in high gloss films. Further, this platelet silica can be used as a narceous material.

Related prior art consists of U.S. Pat. No. 2,801,902 and U.S. Pat. No. 3,328,125. U.S. Pat. No. 2,801,902 teaches the making of planar aggregates of silica spheroids, having a diameter between 5 and 100 millimicrons. The aggregates are 3 or fewer pheroid layer thick. The average dimension in the planar direction is at least 10 times the thickness. The spheroids are negatively charged and the planar aggregates are held together by the addition of a cation surface active agent with a heating step to strengthen the planar aggregate. To further strengthen the planar aggregates, active silica is added after formation of the planar aggregates. The above demonstrates the extra steps which are necessary to even form the planar aggregates of spheroids and to strengthen the planar aggregates so that they can be used. U.S. Pat. No. 3,328,125 discloses producing hexagonal discrete silica particles made by leaching the alumina out of kaolin clay. The resultant pores have large volumes, diameters and surface areas, and can be described as micropores. Further, the silica contents are low, and the metal oxide and water contents are up to 40 percent and more. This is a different product from the platelet particles of this invention, which are a platelet silica gel of a silica content of greater than 95 percent when dried at 105° C.

BRIEF SUMMARY OF THE INVENTION

This invention involves a process for preparing microporous platelet silica particles. The platelet silica gel particles have a length to thickness ratio preferably of at least about 10:1. The synthesis involves first preparing an ammonium stabilized silicic acid solution. This solution is then freeze-dried or alternatively frozen and thawed with or without pH adjustment to produce platelet silica particles, and the platelet silica gel particles collected, washed and dried as necessary.

DETAILED DESCRIPTION OF THE INVENTION

Broadly, the present invention comprises a method for producing a pure microporous, platelet silica gel. The platelets have a length to diameter ratio of from about 5:1 to 50:1 or more. A distinct advantage of the process of the present invention is that on washing, the platelet silica gel is in a pure form and not contaminated with substantial amounts of alkali metal or other similar ion.

Further, the present invention comprises a process for producing such a platelet silica gel of relatively high purity from an ammonium stabilized silicic acid solution. The pH of this ammonium stabilized silicic acid solution is generally in the range of from 10–10.5. There are three variations of the present process for the production of the platelet silica gel from this solution. This solution may be freeze dried, that is rapid freezing followed by a vacuum sublimation to remove volatiles (water). This produces a platelet silica gel in essentially 100 percent yield from the ammonium stabilized silicic solution. In a second embodiment, the ammonium stabilized silicic acid solution may be frozen to precipitate platelet silica gel, followed by a thawing and a removal of precipitated platelet silica gel by filtering or some other technique. The recovery by this process is less than 100 percent, usually about 50–60 percent, due to some silica gel going back into solution during the thawing step. However, in the third embodiment of this process, this redissolution effect is minimized by just prior to freezing the column effluent solution, adjusting the pH of this solution to about 9.5 to about 8 using carbon dioxide or an acid. By such an adjustment of the pH prior to freezing it has been found that during the subsequent thawing substantially no silica redissolves, yielding an essentially 100 percent recovery of platelet silica gel. The pH may be lowered below about 8, but at such lower pH, salts in the solution produced by the pH adjustment tend to adhere onto the platelet silica surface, producing an inferior platelet silica.

Although any one of the above embodiments, that is freeze drying, freeze-thawing or pH adjustment and freeze-thawing, produce the platelet silica gel of the present invention, freeze drying and pH adjustment and freeze-thawing are the preferred techniques due to the higher yields of essentially 100 percent. The choice between these two embodiments, if one is to be made, would be from an economic view. Freeze-drying requires special equipment, which if production is sufficiently high can readily be justified. But if production is not to be at a high level, pH adjustment and freeze-thawing is a very efficient and effective process.

The ammonium stabilized silicic acid used in a subsequent step to form the platelet silica gel is essentially the ammonium form of a silicate or an ammonium silicate, depending on terminology. There is some question as to whether the ammonium analogue to sodium or potassium silicate exists as the compound or as an ammonium stabilized silicic acid. In this invention, for mere convenience and personal prejudices, the term ammonium stabilized silicic acid will be used, but with the understanding that it includes that which some designate as ammonium silicate and which others designate as the ammonium form or analogue of alkali metal silicates. This ammonium stabilized silicic acid can be produced in several ways. A suitable method is the direct reaction of silicic acid with an ammonium compound such as the hydroxide. However, the preferred technique comprises passing an alkali metal silicate through an ion exchange resin in the ammonium form with collection of the effluent ammonium stabilized silicic acid solution. This technique has the advantage that the effluent solution is of a high purity, not requiring purifying or other steps as when the ammonium stabilized silicic acid is produced using other techniques.

In the preferred mode, the present invention comprises passing an aqueous alkali meta silicate solution such as a sodium metasilicate or a potassium metasilicate solution through an ion exchange resin in the ammonium form to produce the ammonium stabilized silicic acid. Either sodium metasilicate or potassium metasilicate are suitable, since both are soluble in water, and in water containing minor amounts of materials such as NaOH, KOH, $Na_2CO_3$, $K_2CO_3$, etc. They are further water soluble in both the anhydrous and hydrous forms. Many of the metasilicates (such as calcium metasilicate and lithium metasilicate) are water-soluble, but are slightly soluble in other solvents such as dilute solution of HCl in water. Generally, the solutions can be prepared by using any solvent in which the silicate or metasilicate is at least partially soluble and which is also compatible with the ion exchange resin (i.e., not prevent the replacement ammonium of the ion exchange resin with the light metal of the metasilicate compound). However, aqueous solutions are preferred, due to ease of handling, cost and other obvious factors. The resulting column effluent solution is collected for subsequent process use when neutral to alkaline to litmus, and is essentially an ammonium stabilized silicic acid solution.

Any ion exchange resin in the ammonium form may be used. Generally, such resins in the ammonium form are prepared by ammonium exchanging strong acid ion exchange resins. Exemplary of such resins are Amberlite IR–120, Amberlite IR–200, Dowex 50, Dowex 50W, Dowex MPC–1, Anolite C–20, Anloite C–25, Ionac C–270, Dowex CCR–1 and Duolite CS–100. After passage of the alkali metasilicate solution through the ion exchange resin, this resin becomes exhausted of ammonium ions and rich in alkali metal ions. The resin can then be regenerated using any known technique such as passing an ammonium salt solution through the resin, useful ammonium salts for the regenerating solution being $NH_4Cl$, $NH_4Br$.

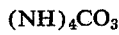

ammonium benzoate, $NH_4CHO_2$, ammonium lactate, $NH_4I$, $NH_4NO_3$, ammonium salicylate,

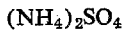

ammonium sulfite, ammonium thiosulfate, etc. The resin is then generally water washed and ready for reuse.

The ammonium stabilized silicic acid column effluent solution is then either freeze-dried, freeze-thawed, or pH adjusted and freeze-thawed. Any one of these techniques produces a platelet silica gel having a thickness of about 0.1 to 5 micron, a length of about 1 to 100 microns, and a length to thickness ratio of about 5:1 to 50:1, and preferably of at least about 5:1. If freeze-dried, a conventional apparatus is used which rapidly freezes the effluent solution with the water removed by a vacuum sublimation. This produces a dry product comprised of platelets of silica gel in essentially 100 percent yield. Or, alternatively, the effluent solution is frozen to at least about −5° C. to −195° C. and then thawed. The resultant platelet silica gel particles are recovered from the effluent by any known means, such as filtration. The particles are then washed, if desired, with water or other suitable solvent and dried by any conventional means. This alternative gives a good product, but in reduced quantities. And, in a further alternative, the collected column effluent solution can be treated to lower the pH and then frozen and thawed. The freezing temperature used may range from that of an ice-salt bath to liquid nitrogen (−5° C. to −195° C.). In a preferred mode, either a Dry Ice-acetone bath or liquid nitrogen is used. More rapid freezing produces platelets of a decreased thickness. The resultant platelet silica gel particles are recovered from the effluent by any known means such as filtration. The particles are washed, if desired, with water, etc., to remove any free salts such as free $NH_4Cl$, free carbonate, etc., and dried by any conventional means. This alternative also gives a good product, and 98 to 100 percent recovery. The pH of the column effluent in this mode is adjusted by bubbling $CO_2$ through it, or by adding a mineral acid (inorganic acid), preferably HCl. Examples of other useful inorganic acids are $H_3AsO_4$, $HAsO_2$, $H_3CO_4$, $H_2CO_3$, hydrocyanic acid, $HIO_4$, $H_4P_2O_7$, $H_2SeO_3$, $H_2SO_4$, HCl, $HNO_2$, $HIO_3$, $H_2SO_3$, etc. The preferred technique is to use $CO_2$. The pH can be lowered to as low as about 2.5, but generally is lowered no lower than about 8, and preferably to about 9. In a further mode of this alternative, the column effluent solution which has been adjusted in pH can be stored for varying periods of time prior to freezing and thawing. This period of time varies from 10 minutes to weeks or more, depending on the final pH and the adjusting substance. However, in most processes which are of a continuous nature, and preferred in this instance, the pH adjusted column effluent solution is not stored but the steps of freezing and thawing conducted to produce the platelet silica particles.

The resulting product from either of the alternative techniques is washed and dried. This product is comprised of unitary, polymeric microporous platelet silica gel particles. The surface area of the platelet silica gel is between 400 and 500 m.$^2$/gm. (obtained using the three point B.E.T. method for surface area). This surface area is caused by the usual silica gel pore structure, with the pore surface area accounting for about 98 percent of the value, and the actual external surface area of the particles accounting for the remainder. This high internal surface area is due to porosity, caused by the small micelles being held together by hydrogen bonded silanol groups. These micelles form during synthesis of the silica gel platelets. Upon heating at temperatures greater than 800° F., these silanol groups and any residual water is lost causing a collapse of the pore structure, which reduces the total surface area to less than 50 m.$^2$/gm., depending on temperature and time duration of heating. The platelet silica has the same structure as silica gel, and consists mainly of extremely small pores having an average pore diameter of 70 A. and an average pore volume of 0.9 cc./gm.

The following examples aid in explaining, but should not be deemed as limiting, the instant invention. In all cases, unless otherwise noted, all parts and percentages are by weight.

EXAMPLE I 400 ml. of Dowex 50 resin are placed in a 500 ml. separatory funnel topped with a 400 ml. flow control funnel. Dowex 50 resin is a synthetic ion-exchange resin and is commercially available from Dow Chemical Co. The resin is placed in the ammonium form by running 48 ml. of 10 percent $NH_4Cl$ solution through the column and then washing the resin with distilled water until chloride free. A dilute sodium metasilicate solution (80 gm. of 40 Bé $Na_2SiO_3$+320 gm. $H_2O$) is run through the column and followed with 400 ml. of distilled water. Effluent solution collection is started when alkaline to litmus paper. The content of the entire collected effluent solution is placed in multiple freeze dry apparatus, which is run for 24 hours, producing a dry and fluffy product. A VisTis Freeze Dryer is used (all glass). The platelet product is unitary, transparent, microporous, platelets of silica gel having a thickness of 1 to 5 micron, length of 10 to 100 microns, and a length to thickness ratio of at least 10:1. The pore volume length to thickness of at least 10:1. The pore volume is 0.9 cc./gm., pore diameter 70 A., and surface area 450 m.$^2$/gm., of which about 98 percent is due to pores.

EXAMPLE II

Example I was repeated, except that an equal strength solution of potassium metasilicate was used in place of the sodium metasilicate solution. Platelet silica was obtained.

EXAMPLE III

Example I was repeated, except that one gram of NaOH was dissolved in the $Na_2SiO_3$ solution before it was run through the column containing the ion-exchange resin. Platelet silica was obtained.

EXAMPLE IV

Example I was repeated, except that the ion-exchange resin was put in the ammonium form by passing a 10 percent solution of $NH_4NO_3$ through it. Platelet silica was obtained.

EXAMPLE V

The ion-exchange resin of Example I was regenerated by passing a 10 percent solution of ammonium chloride through it and washing it with water until the washings were chloride free. Example I was repeated using the regenerated ion exchange-resin.

EXAMPLE VI

Example I was repeated, except that the ion-exchange resin was Amberlite IR–120. Amberlite IR–120 is a synthetic, sulfonated styrene-divinylbenzene copolymer, ion-exchange resin and is commercially available from Rohm & Haas Co. Platelet silica was obtained.

EXAMPLE VII

Example I was repeated, except that the ion-exchange resin was Ionac C–240. Ionac C–240 is a synthetic, sulfonated styrene-divinylbenzene copolymer, ion-exchange resin and is commercially available from Ionac Chemical Co. Platelet silica was obtained.

EXAMPLE VIII

Example I was repeated, except that the ion exchange resin was Duolite C–25. Duolite C–25 is a synthetic, sulfonated styrene-divinylbenzene copolymer, ion-exchange resin and is commercially available from Diamond Alkali Co. Platelet silica was obtained.

EXAMPLE IX

Example I was repeated, except that the ion-exchange resin was Dowex CCR–1. Dowex CCR–1 is a phenolic condensation reaction product which incorporates the carboxylic acid group and is commercially available from Dow Chemical Co.

EXAMPLE X 400 ml. of Dowex 50 resin are placed in a 500 ml. separatory funnel topped with a 400 ml. flow control funnel. Dowex 50 resin is a synthetic ion-exchange resin and is commercially available from Dow Chemical Co. The resin is placed in the ammonium form by running 48 ml. of 10 percent $NH_4Cl$ solution through the column and then washing the resin with distilled water until chloride free. A dilute sodium metasilicate solution (80 gm. of 40 Bé $Na_2SiO_3 + 320$ gm. $H_2O$) is run through the column and followed with 400 ml. of distilled water. Effluent solution collection was started when alkaline to litmus paper. The content of the entire collected effluent solution is: $SiO_2$, 2.5 percent; Cl, 0.04 percent; $Na_2O$, 0.02 percent; and $NH_3$, 0.5 percent; and the pH was 10.2. The entire collected effluent solution is quickly frozen using a liquid nitrogen chamber. After thoroughly freezing, the frozen effluent solution is removed from the liquid nitrogen and thawed. The thawed mixture is filtered, cold water washed and dried in a hot air oven. Platelet silica is recovered in about a 60 percent yield. The platelet silica gel has a thickness of 0.5 to 5 microns and a length to thickness ratio of about 10 to 1.

EXAMPLE XI

Example X was repeated, using a Dry Ice-acetone bath (78° C.) instead of liquid nitrogen. Platelet silica was obtained.

EXAMPLE XII

Example was repeated using an ice-salt bath instead of the liquid nitrogen. Platelet silica was obtained, but having a greater thickness. A slower rate of freezing generally yields particles of greater thickness.

EXAMPLE XIII 400 ml. of Dowex 50 resin are placed in a 500 ml. separatory funnel topped with a 400 ml. flow control funnel. Dowex 50 resin is a synthetic ion-exchange resin and is commercially available from Dow Chemical Co. The resin is placed in the ammonium form by running 48 ml. of 10 percent $NH_4Cl$ solution through the column and then washing the resin with distilled water until chloride free. A dilute sodium metasilicate solution (80 g. of 40 Bé $Na_2SiO_3 + 320$ g. $H_2O$) is run through the column and followed with 400 ml. of distilled water. Effluent solution collection is started when alkaline to litmus paper. The content of the entire collected effluent solution is: $SiO_2$, 2.5 percent; Cl, 0.04 percent; $Na_2O$, 0.02 percent; and $NH_3$, 0.5 percent; and the pH was 10.2. The pH of this effluent solution is adjusted to 9.0 by bubbling $CO_2$ through the solution. The effluent is then frozen using liquid nitrogen, and thawed to in the range of 0° C.–5° C. the thawed mixture is filtered and cold water washed until carbonate free. This silica gel filter cake is then dried in a hot air oven. The particles have a thickness 0.5 to 3 microns and a length of 5 to 60 microns.

EXAMPLES XIV–XXI

Example XIII is repeated, but using HCl to adjust the pH of the ion-exchange column effluent solution to various pH's between 9 and 2.5 (see table). These examples illustrate the change in silica platelet quality as the pH is reduced in stages from 9.0 to 2.5.

TABLE

| Example No. | pH  | Freeze-thaw product |
| --- | --- | --- |
| XIV | 9.0 | Platelets—transparent, good recovery. |
| XV | 8.5 | Platelets—slight hazing of surface. |
| XVI | 8.0 | Platelets—increased hazing. |
| XVII | 7.5 | Platelets—increased haze. |
| XVIII | 7.0 | Plates—increased haze. |
| XIX | 6.5 | Do. |
| XX | 5.5 | Do. |
| XXI | 2.5 | Plates—very rough surface, not transparent. |

What is claimed is:

1. A process for preparing microporous, platelet silica particles having a length to thickness ratio of at least about 5:1 and a surface area of 400 to 500 m.²/gm., which comprises:
   (a) forming an ammonium stabilized silicic acid solution;
   (b) freezing said solution;
   (c) thawing the effluent solution which contains platelet silica particles; and
   (d) recovering said platelet silica particles.

2. A process as described in claim 1 wherein said ammonium stabilized silicic acid is formed by passing a solution of soluble silicate salt through an ion-exchange resin in the ammonium form.

3. A process as described in claim 2 wherein said soluble silicate is an alkali metal metasilicate.

4. A process as described in claim 3 wherein said alkali metasilicate is selected from the group consisting of sodium metasilicate and potassium metasilicate.

5. A process for preparing microporous, platelet silica particles having a length to thickness ratio of at least about 5:1 and a surface area of 400 to 500 m.²/gm., which comprises:
   (a) forming an ammonium stabilized silicic acid solution;
   (b) adjusting the pH of said solution from about 8 to 9.5;
   (c) freezing said solution;
   (d) thawing the solution which contains platelet silica particles; and
   (e) recovering said platelet silica particles.

6. A process as described in claim 5 wherein said ammonium stabilized silicic acid is formed by passing a solution of a soluble silicate through an ion-exchange resin in the ammonium form.

7. A process as described in claim 6 wherein said soluble silicate is an alkali metal silicate.

8. A process as described in claim 7 wherein said alkali silicate is selected from the group consisting of sodium silicate and potassium silicate.

9. A process as in claim 5 wherein said pH is adjusted to about 9.

10. A process as in claim 5 wherein said pH is adjusted by adding a substance selected from the group consisting of carbon dioxide and an inorganic acid solution.

11. A process as in claim 5 wherein said pH is adjusted by adding carbon dioxide.

12. A process as in claim 5 wherein said solution is frozen by exposure to a temperature from about $-5°$ C. to about $-195°$ C.

13. A process as in claim 12 wherein said temperature is about $-195°$ C.

14. A process as in claim 12 wherein said temperature is about $-78°$ C.

References Cited

UNITED STATES PATENTS

| | | | |
|---|---|---|---|
| 3,301,635 | 1/1967 | Bergna et al. | 23—182 |
| 3,041,140 | 6/1962 | Alexander | 23—182 |
| 3,081,154 | 3/1963 | Acker et al. | 23—182 |
| 3,218,726 | 11/1965 | Muir | 23—182 X |
| 2,561,304 | 7/1951 | Hazel | 23—182 |
| 2,278,746 | 4/1942 | Sturgeon | 23—182 X |
| 3,345,132 | 10/1967 | Wulf | 23—182 |
| 3,401,017 | 9/1968 | Burke | 23—182 |

HERBERT T. CARTER, Primary Examiner

U.S. Cl. X.R.

34—5